United States Patent [19]

Wezel

[11] Patent Number: 4,711,457
[45] Date of Patent: Dec. 8, 1987

[54] DRILL CHUCK FOR HAND-HELD TOOLS

[75] Inventor: Erich Wezel, Frickenhausen, Fed. Rep. of Germany

[73] Assignee: Hilti Aktiengesellschaft, Fürstentum, Liechtenstein

[21] Appl. No.: 871,710

[22] Filed: Jun. 6, 1986

[30] Foreign Application Priority Data

Jun. 7, 1985 [DE] Fed. Rep. of Germany ....... 3520324

[51] Int. Cl.$^4$ ............................................. B23B 31/12
[52] U.S. Cl. ....................................... 279/65; 279/1 B
[58] Field of Search ............................ 279/65, 60, 1 B; 409/230, 231, 232, 233, 234; 408/239, 239 A

[56] References Cited

U.S. PATENT DOCUMENTS 2,253,345  8/1941  Palmyren ............................... 279/60
2,544,088  3/1951  Hollis ..................................... 279/60
2,931,660  4/1960  Barwinkel .......................... 279/65 X Primary Examiner—Z. R. Bilinsky
Attorney, Agent, or Firm—Toren, McGeady & Associates

[57] ABSTRACT

A drill chuck has clamping jaws which can be locked by means of the thread on a chuck member. The thread has a small pitch. The clamping jaws are positioned by a guide sleeve. An adjustment adapter positions the guide sleeve and adjusts the clamping jaws via a coupling member selectively engageable with the thread. The coupling member has threaded segments selectively engageable with the threads on the chuck member. The coupling member is engaged with or disengaged from the chuck member by rotation of the adjustment adapter relative to the coupling member. Cams on the adjustment adapter co-act with control faces on the coupling member in selectively positioning the threaded segments. With the threaded segments disengaged, the adapter moves the guide sleeve into the desired position to clamp the jaws on a drilling tool or bit and the jaws can be locked by engagement of the threaded segments with the thread on the chuck member.

5 Claims, 3 Drawing Figures

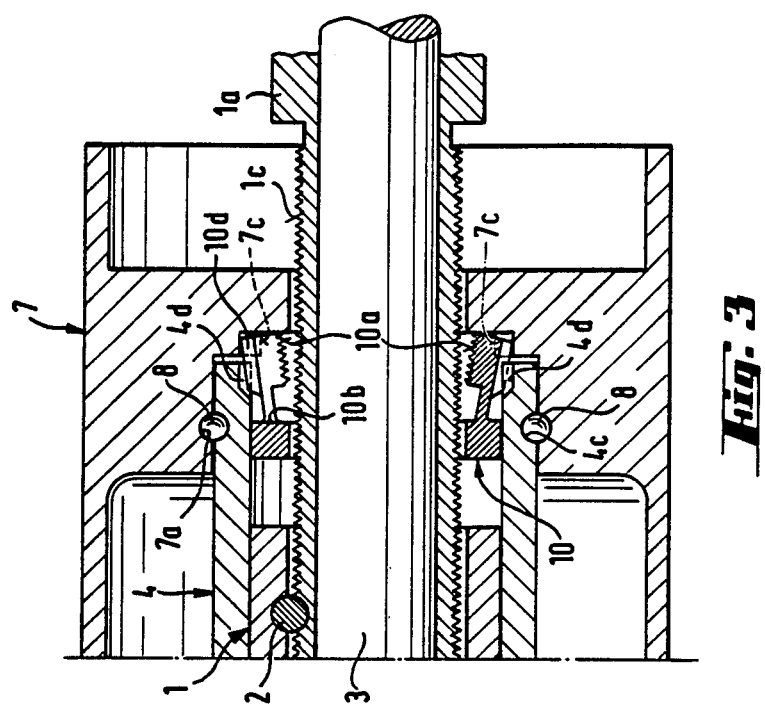
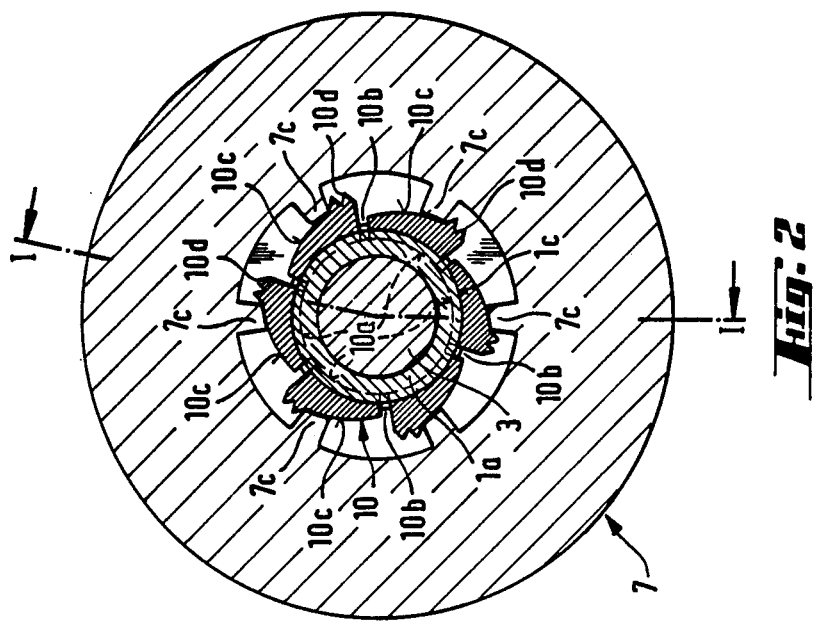

DRILL CHUCK FOR HAND-HELD TOOLS

BACKGROUND OF THE INVENTION

The present invention is directed to a drill chuck for holding tools or bits in hand-held devices such as percussion drills, hammer drills and the like with the drill chuck including a chuck member provided with a thread on its exterior surface, a guide sleeve enclosing a portion of the chuck member and at least two clamping jaws supported in the chuck member so that they can be radially displaced. An adjustment adapter axially displaces the guide sleeve and, in turn, the guide sleeve radially positions the clamping jaws. The adjustment adapter and the guide sleeve can be displaced axially relative to the chuck member.

In drill chucks which simultaneously transmit rotational and percussion movement to a tool or tool bit, there are two different types of clamping action.

In a positive locking action, the insertion end of the tool has recesses or protrusions with which the clamping jaws engage in a positive locking manner. In such a chuck, radial play present between the clamping jaws and the end of the tool affords a limited axial movement within the drill chuck.

If a frictional locking action is provided, the insertion end of the tool does not have any recesses or protrusions and has a smooth surface. The clamping jaws are pressed radially against the insertion end during the clamping action by means of the drill chuck. The transmission of torque and the axial retention of the tool takes place only by way of the frictional lock which, in turn, depends on the applied clamping force. To prevent a loosening of the tool because of vibration developed in operation, such a clamping force must be considerable.

In previously known clamping chucks for hammer drills, percussion drills and the like, auxiliary tools are required for obtaining a frictional lock to exert the required clamping force. Such auxiliary tools are, for instance, gear rim wrenches which can be brought into engagement with a set of teeth arranged on the adjustment adapter and the adjustment or tightening action can be cumbersome and time consuming. Moreover, it is possible to leave the wrench engaged so that is represents a considerable possibility of injury when the hand-held device is operated. If the operator misplaces or loses the the wrench, a new wrench must be obtained to change the tool and delays may be caused in using the device. Quick clamping drill chucks using frictional locking and actuatable without auxiliary tools have not found any practical acceptance up to the present time in hammer drills, percussion drills and the like. Such lack of acceptance occurs because such chucks are very complicated and thus not economical. In addition, the clamping forces attained in the chuck depend to a great degree upon the torque developed during operation of the device, whereby the tool is not sufficiently tightly clamped or it is necessary to use a tool to open the chuck.

SUMMARY OF THE INVENTION

Therefore, it is the primary object of the present invention to provide a drill chuck for positive and frictional locking of tools or bits in hand-held devices such as percussion drills, hammer drills and the like where the chuck can be operated in a simple manner and afford a strong clamping action by exerting a relatively small force.

In accordance with the present invention, the adjustment adapter is connectible by means of a coupling member with a thread on the chuck member where the thread has a small pitch. The coupling member can be selectively engaged and disengaged with the thread.

Preferably, the thread on the chuck member is a so-called fine pitch thread. Such a fine pitch thread has a smaller pitch as compared with a normal thread and thus a smaller pitch angle. A rapid resetting of the drill chuck for adapting clamping jaws to the shank diameter of the bit or tool is possible because the coupling member can be selectively engaged and disengaged. After the coupling member is disengaged, the adjustment adapter is axially displaceable along with the guide sleeve relative to the chuck member. When a desired position of the clamping jaws is reached, the coupling member can be re-engaged so that the adjustment adapter is connected to the chuck member at the thread.

When a tool is frictionally locked in the drill chuck, considerable forces can be developed. To distribute such forces, the coupling member is divided into one or several threaded segments selectively engageable and disengageable with respect to the thread. If several threaded segments are used, preferably they are uniformly distributed around the circumference of the chuck member. To avoid excessively high pressures, the threaded segments can be arranged for simultaneous engagement with several turns of the thread on the member.

To displace the adjustment adapter relative to the chuck member, the meshed engagement between the two must be disengaged. Therefore, for simple operation of the drill chuck it is advantageous if the threaded segments are retained by spring elements in the disengaged condition from the thread on the chuck member. The biasing force of such spring elements can be relatively small.

In a preferred embodiment of the invention, the coupling member is sleeve-shaped with fingers, acting as spring elements, formed at the free ends of the threaded segments by axially slitting the coupling member. As a result, the coupling member acts in the manner of clamping pliers. The threaded segments are interconnected with one another as a monolithic part and such an arrangement is particularly advantageous for both fabrication and assembly. Due to the flexural characteristic of the coupling member, no additional spring elements are needed. Such an arrangement affords simple assembly.

To obtain a simple and rapid actuation of the drill chuck, the coupling member is engageable and disengageable relative to the chuck member by means of the adjustment adapter. Such engagement and disengagement can be achieved by rotation of the adjustment adapter relative to the chuck member.

In a preferred arrangement, the adjustment adapter and the coupling member have cooperating cams and control faces. Further, the cams can limit the rotation of the adjustment adapter with regard to the coupling member. The individual segments on the coupling member can be engaged with the thread on the chuck member either simultaneously or consecutively by means of the control faces. With the appropriate design of the control faces the threaded engagement can be achieved continuously so that no jamming action occurs, for instance when the thread turns impact one against the other. The control faces can be provided on the coupling member or on the adjustment adapter.

To assure the relative movement between the coupling member and the adjustment adapter required for actuation of the coupling member, a connection arrangement for engaging the adjustment adapter is provided in the event the coupling member is disengaged. Such a connection arrangement does not need to transmit large forces and, therefore, can be dimensioned relatively small. As an example, the connection arrangement can be in the form of a friction clutch. When the coupling member is engaged with the chuck member, the connection arrangement is not effective.

During the engagement of the coupling member with the chuck member, the connection arrangement with the adjustment adapter must be interrupted. In such an arrangement, a certain overlap can be useful. Therefore, it is appropriate to design the connection arrangement on the coupling member and the adjustment adapter as teeth extending in the axial direction, such as as a serrated surface.

Due to the small pitch of the chuck member thread, the torque applied manually on the adjustment adapter is generally sufficient for tightly clamping the drill bit. To increase operational ease, the adjustment adapter can be provided with engagement means, such as recesses, cams or the like at which auxiliary means can be applied.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is a cross-sectional view of the drill chuck taken along the line II—II in FIG. 1; and FIG. 3 is a partial section of the drill chuck shown in FIG. 1, with the chuck in the disengaged state.

DETAILED DESCRIPTION OF THE INVENTION

Figure 1:
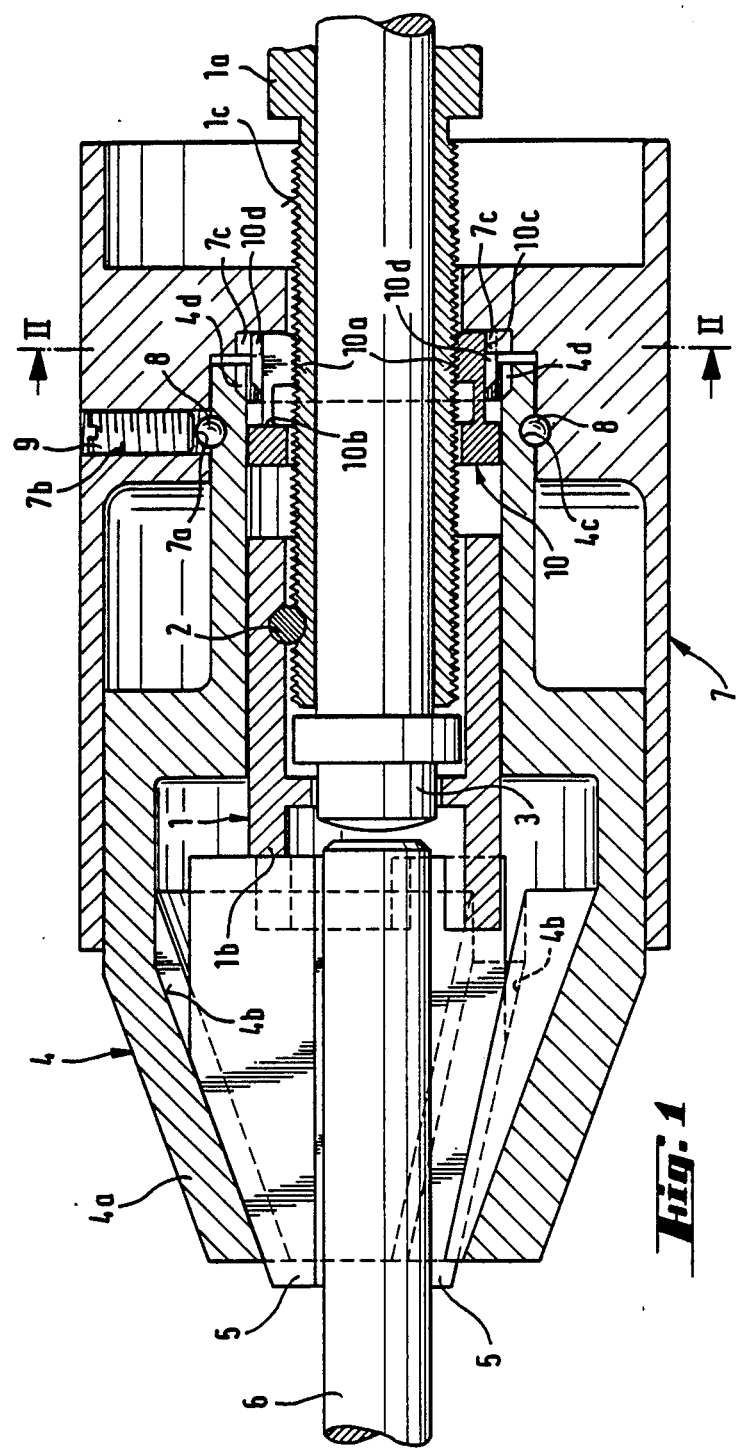
FIG. 1 is an axially extending sectional view of a drill chuck embodying the present invention.

In FIG. 1 a drill chuck is illustrated including a chuck member 1. As viewed in FIG. 1 the left-hand end of the drill chuck is the leading end and the right-hand end is the trailing end. The chuck member 1 is an axially extending spindle sleeve 1a with a jaw guide 1b secured on the leading end part of the sleeve by tangentially extending pins 2. The jaw guide 1b extends axially forwardly of the leading end of the spindle sleeve 1a. The axially extending outer surface of the spindle sleeve 1a has a thread 1c with a small pitch. An axially extending anvil 3 is guided within the spindle sleeve 1a so that it can be axially displaced in the direction out of the leading end of the sleeve. Chuck member 1 is laterally enclosed by a guide sleeve 4 with the guide sleeve extending axially outwardly from the leading end of the chuck member. The guide sleeve 4 extends around the leading end part of the spindle sleeve 1a and the portion 4a projecting axially from the spindle sleeve is conically shaped on both its inner and outer surface. The inner surface of the guide sleeve in the portion 4a has guide grooves 4b for the radially extending clamping jaws 5. Clamping jaws 5 tightly grip the inserted end of a drill bit 6. The clamping jaws at their trailing ends are fitted into the jaw guide 1b. The jaws 5 interconnect the guide sleeve 4 with the chuck member 1 so that the guide sleeve can be axially displaced relative to the chuck member but cannot rotate relative to it. An adjustment adapter 7 laterally encloses the trailing end part of the guide sleeve 4 and extends rearwardly from the guide sleeve and inwardly toward the spindle sleeve 1a. The adjustment adapter can be rotated relative to the guide sleeve 4, however, it is secured with the guide sleeve so that they move as a unit in the axial direction. A rotatable connection is afforded between the adjustment adapter 7 and the guide sleeve 4 by balls 8 with the radially inner part of the balls being located in an annular groove 4c in the guide sleeve, and the balls extending outwardly into a recess 7a in the adjustment adapter. Insertion of the balls 8 into the groove 4c and the cooperating recess 7a takes place through a threaded bore 7b extending radially inwardly from the outside surface of the adjustment adapter to the recess. The bore 7b is closed, after the insertion of the balls, by a set screw 9. A coupling member 10 includes a number of threaded segments 10a separated from one another by longitudinal slits 10b extending for a portion of the axial length of the coupling member. As viewed in FIG. 1, threaded segments 10a are engaged with the thread 1b on the spindle sleeve 1a. The adjustment adapter is engaged with the chuck member by the meshed engagement of the threaded segments 10a with the thread 1c. To clamp the clamping jaws 5 tightly, the adjustment adapter after engagement with the thread 1c can be rotated relative to the chuck member.

In the cross-sectional view of the drill chuck displayed in FIG. 2, the anvil 3 is guided within the spindle sleeve 1a. The threaded segments 10a of the coupling member 10 are in meshed engagement with the thread 1c on the outside of the spindle sleeve 1a. As mentioned above, the threaded segments 10a are spaced apart around the circumference of the spindle sleeve 1a by the axially extending slits 10b, note the slit shown in FIG. 1 and FIG. 2. The slits extend for an axial portion of the coupling member, including a reduced diameter portion intermediate the ends of the coupling member, from the trailing end of the segments 10a toward the leading end. Threaded segments 10a have a tendency to move radially outwardly out of engagement with the thread 1c due to the clamping force of the coupling member 10. Control faces 10c are formed on the radially outer surfaces of the threaded segments 10a, note FIG. 2. These control faces 10c interact with cams 7c extending radially inwardly on the inner surface of the adjustment adapter 7. As viewed in FIG. 2, when the adjustment adapter is rotated counterclockwise the threaded segments 10 move radially outwardly because of the tendency to move in that direction. As the threaded segments 10a move radially outwardly they become disengaged from the thread 1c.

The disengaged position of the threaded segments 10a is exhibited in FIG. 3. Further, the coupling member at the radially outer side of the threaded segments 10a has a set of teeth 10d extending in the axial direction. The trailing end of the guide sleeve 4 in its inner surface has a complementary set of teeth 4d extending in the axial direction. Accordingly, when the coupling member moves out of engagement with the thread 1c the teeth 10d, it moves into engagement with the teeth 4d on the guide sleeve 4. The interengaged teeth 4d, 10d prevent movement of the coupling member 10 if the adjustment adapter 7 is rotated relative to the spindle sleeve 1a. The teeth 4d also serve to effect the movement of the coupling member when the guide sleeve is displaced axially by the adjustment adapter 7. When the clamping jaws 5 have been set in the desired radial position by the axial movement of the adjustment adapter and the guide sleeve, the adjustment adapter is rotated clockwise to the position shown in FIG. 2 and the threaded segments 10a are pressed radially inwardly by the cam 7c engaging the control face 10c effecting the engagement of the teeth on the segments with the thread 1c. Note in FIG. 1, that the threaded segments 10a engage an axially extending part of the thread 1c so that a number of turns of the thread mesh with the threaded segments.

While specific embodiments of the invention have been shown and described in detail to illustrate the application of the inventive principles, it will be understood that the invention may be embodied otherwise without departing from such principles.

I claim:

1. Drill chuck for securing a tool in a hand-held device, such as a percussion drill, a hammer drill or similar device, comprising an axially extending chuck member having a leading end and a trailing end, said chuck member having an axially extending radially outer surface with an axially extending thread formed in the outer surface, a guide sleeve laterally enclosing an axially extending part of said chuck member from the leading end toward the trailing end thereof, at least two clamping jaws fitted into the leading end of said chuck member and extending in the axial direction of the chuck member outwardly from the leading end thereof and located within said guide sleeve, said guide sleeve having a support surface engageable with said clamping jaws for determining the radial position of said clamping jaws, a sleeve-like adjustment adapter laterally enclosing an axially extending part of said guide sleeve and said chuck member, said adjustment adapter being axially displaceable relative to said chuck member and being secured to said guide sleeve for axially displacing said guide member and effecting radial displacement of said clamping jaws, wherein the improvement comprises a coupling member located within and in engagement with said adjustment adapter and encircling said chuck member, said coupling member including a radially displaceable part selectively threadedly engageable with said thread on said chuck member, and said thread on said member having a small pitch, said coupling member has at least one radially displaceable threaded segment for selective engagement and disengagement with said thread on said chuck member, said coupling member comprises a plurality of said threaded segments arranged serially in the circumferential direction, and said coupling member including spring means for biasing said threaded segments radially outwardly from said thread on said chuck member, and said coupling member is an axially extending sleeve-shaped member having a reduced diameter section intermediate the axial ends of said coupling member with slits formed in said coupling member for separating said threaded segments and for dividing said reduced diameter sections into individual fingers acting as spring elements for said threaded segments.

2. Drill chuck, as set forth in claim 1, wherein means formed on said coupling member and cooperating means formed on said adjustment adapter for effecting the engagement and disengagement of said coupling member with said chuck member.

3. Drill chuck, as set forth in claim 2, wherein said means on said coupling member comprises circumferentially extending control faces on the radial outer surfaces of said threaded segments and said means on said adjustment adapter comprises radially inwardly directed cams in contact with said control faces.

4. Drill chuck, as set forth in claim 1, including means formed on the radially outer surface of said threaded segments and on the radially inner surface of said guide sleeve for effecting engagement between said coupling member and said guide sleeve when said coupling member is disengaged from said chuck member.

5. Drill chuck, as set forth in claim 4, wherein said means for interconnecting said coupling member and said guide sleeve comprises first teeth on said guide sleeve and second teeth on said coupling member with said first and second teeth extending in the axial direction and being engageable when said coupling member is disengaged from said chuck member.

* * * * *